INVENTORS
DORR E. TIPPENS
MAX A. COHEN
FREEMAN BUSH
BY
Thomas F. Moran
ATTORNEY 94.8 PURITY — OPERATING CONTROL CHART
COOKING TEMP. & VACUUM VS SYRUP CONCENTRATION July 13, 1965  D. E. TIPPENS ETAL  3,194,682
SUGAR PRODUCT AND METHOD OF PRODUCING SAME
Filed April 3, 1963  6 Sheets-Sheet 4

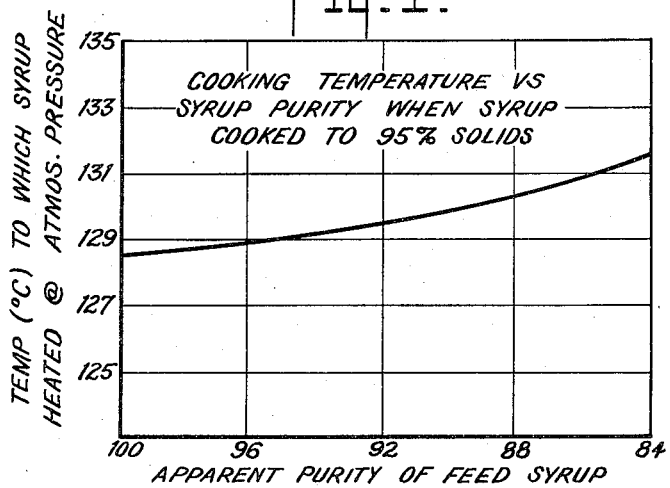
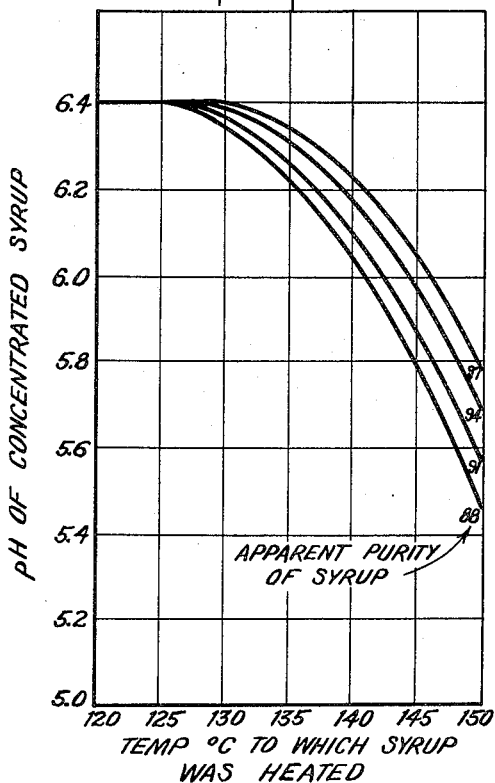
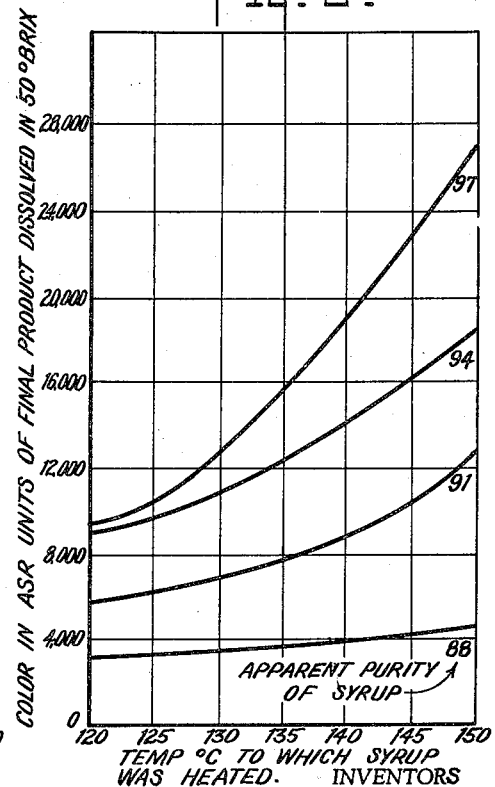

97.5 PURITY — OPERATING CONTROL CHART
COOKING TEMP. & VACUUM VS SYRUP CONCENTRATION

INVENTORS
DORR E. TIPPENS
MAX A. COHEN
FREEMAN BUSH
BY
Thomas F. Moran
ATTORNEY

July 13, 1965 D. E. TIPPENS ETAL 3,194,682
SUGAR PRODUCT AND METHOD OF PRODUCING SAME
Filed April 3, 1963 6 Sheets-Sheet 6

89.0 PURITY — OPERATING CONTROL CHART
COOKING TEMP. & VACUUM VS SYRUP CONCENTRATION

INVENTORS
DORR E. TIPPENS
MAX A. COHEN
BY FREEMAN BUSH

Thomas J. Moran
ATTORNEY

United States Patent Office 3,194,682
Patented July 13, 1965

3,194,682
SUGAR PRODUCT AND METHOD OF
PRODUCING SAME
Dorr E. Tippens, Greenwich, Conn., and Max A. Cohen, Utopia, and Freeman Bush, Hollis, N.Y., assignors to American Sugar Company, a corporation of New Jersey
Filed Apr. 3, 1963, Ser. No. 270,355
15 Claims. (Cl. 127—30)

This invention relates to sugar products in granular, free-flowing and non-caking form. More particularly, in accordance with one embodiment this invention relates to granular, free-flowing, non-caking sugar products having a brown sugar flavor. In accordance with another embodiment, this invention relates to a non-caking, free-flowing, granular, predominantly sucrose-containing sugar product, said sugar product comprising essentially aggregates of fondant-size sucrose crystals. By fondant-size sucrose crystals is meant sucrose crystals having a particle size in the range 3–50 microns, more or less. In accordance with yet another embodiment, this invention is directed to a free-flowing, non-caking, granular, sucrose-containing sugar product consisting essentially of fondant-size sucrose crystals together with a suitable additive material to impart a desirable physical or chemical property, color, taste, pharmaceutical or prophylactic value and/or other desirable property or value thereto other than that derived from sucrose alone.

Various techniques and processes are known, see U.S. Patents 2,098,604 and 2,824,808 and Canadian Patent 635,180, for preparing sugar products having special properties. For the most part, however, prior processes involve heating a sugar syrup to an elevated temperature, followed by the addition of suitable finely-divided sugar seeding material or by cooling to effect supersaturation in the sugar syrup and by crystallization. The manufacture of a sugar product having uniform and reproducible properties by such techniques, however, has not been completely satisfactory. Further, processes available heretofore for producing sugar products of the type disclosed and claimed herein have not had the desired versatility with respect to the ability to handle varying and different sugar streams, such as are available in a sugar refinery, e.g. granulated sugar syrups, remelt syrups, black strap molasses, soft syrups and dark soft syrups and the like.

Accordingly, it is an object of this invention to provide an improved process for the manufacture of sugar products.

Another object of this invention is to provide an improved process for the manufacture of sugar products containing aggregates of fondant-size sucrose crystals.

Still another object of this invention is to provide a sugar product consisting essentially of fondant-size sucrose crystals, said product having improved properties with respect to storage or shelf life, flowability and caking resistance.

Yet another object of this invention is to provide an improved process for the manufacture of sugar products wherein the process is capable of handling a wide variety of sucrose-containing streams or syrups and capable of producing a wide variety of sucrose-containing products of improved physical properties with respect to flowability and caking resistance.

How these and other objects of this invention are obtained will become apparent in the light of the accompanying disclosure made with reference to the accompanying drawings wherein:

FIG. 1 is a graphical representation showing the cooking temperature required to cook sugar syrups of various percent purity to 95% solids, purity of a syrup being the percent by weight sucrose in the total solids in the syrup;

FIG. 2 is a graphical representation of the influence of cooking temperature upon the pH of various sugar syrups;

FIG. 3 is a graphical representation of the effect of cooking temperature upon color of various sugar syrups;

Figure 4:
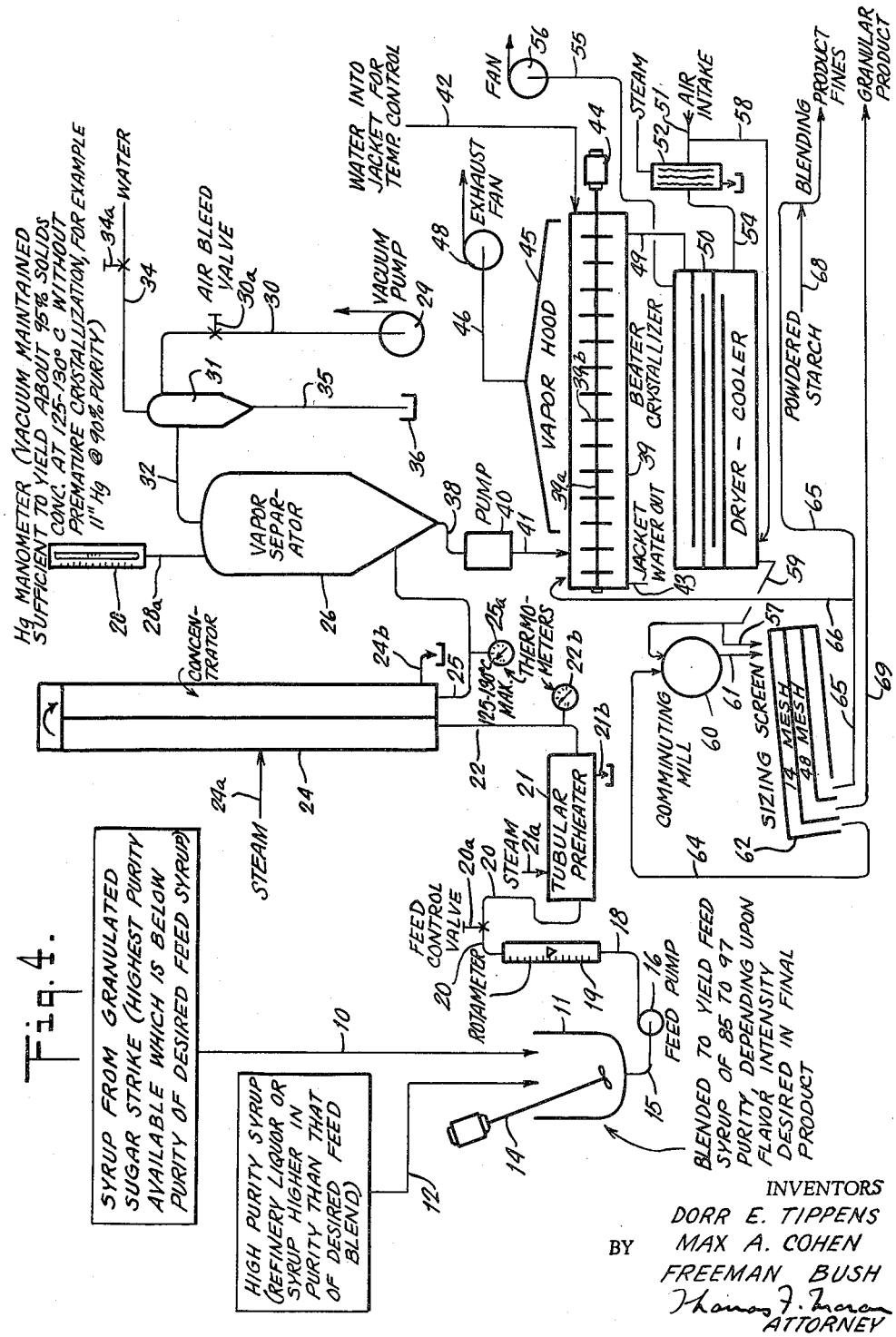
Figure 9:
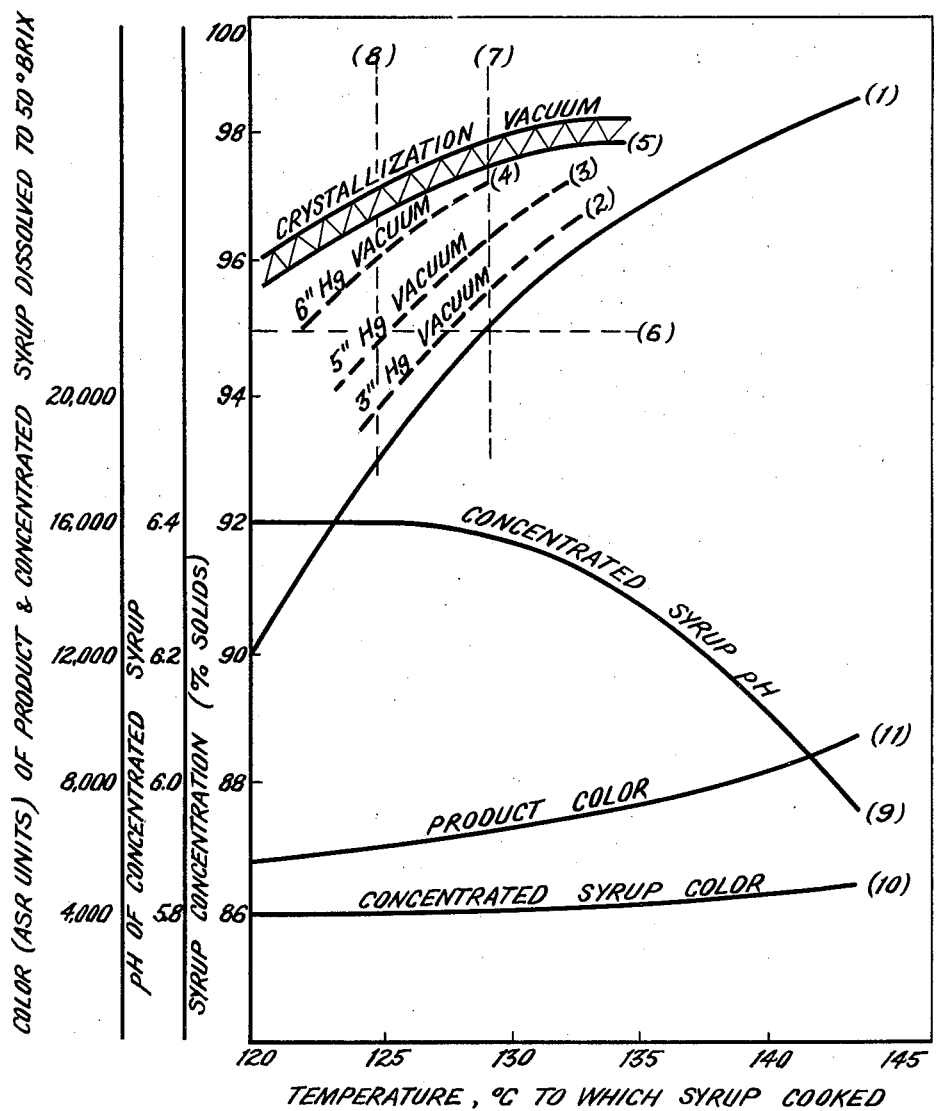
Figure 6:
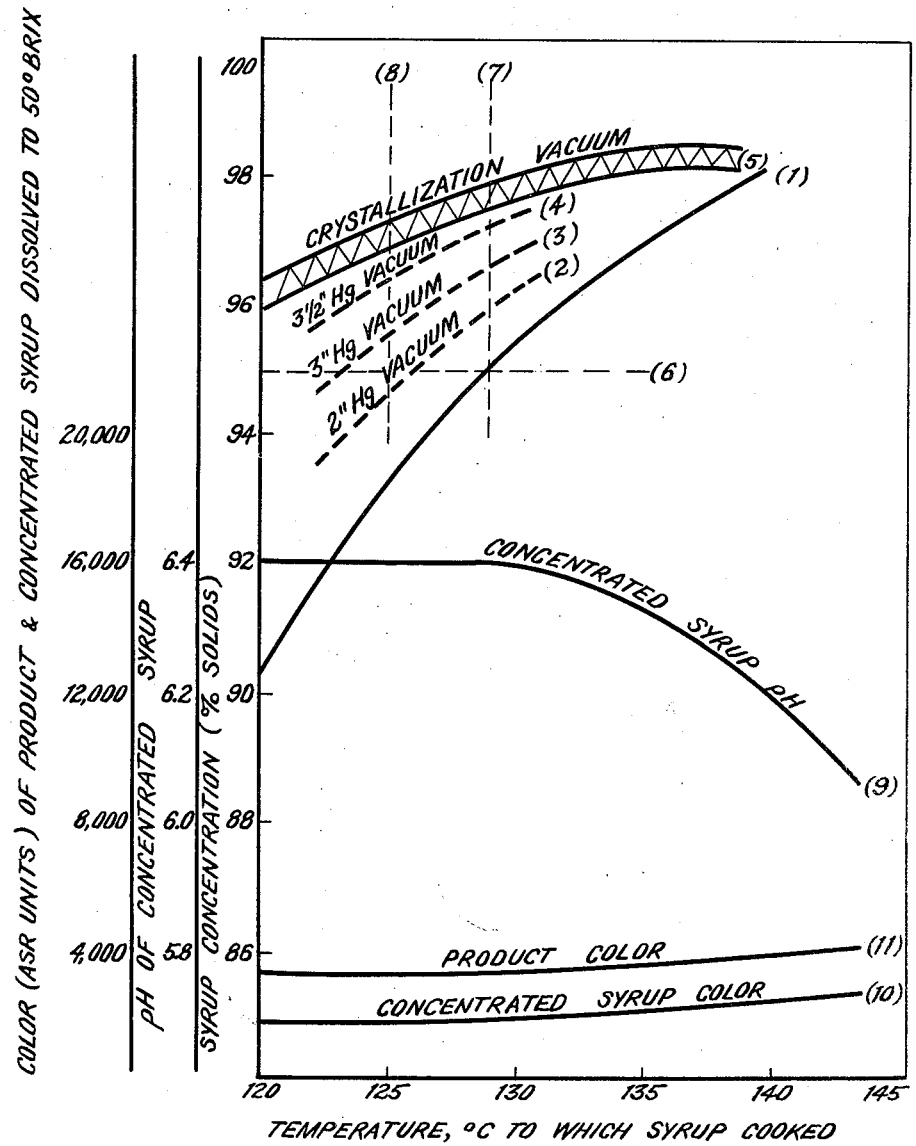
Figure 7:
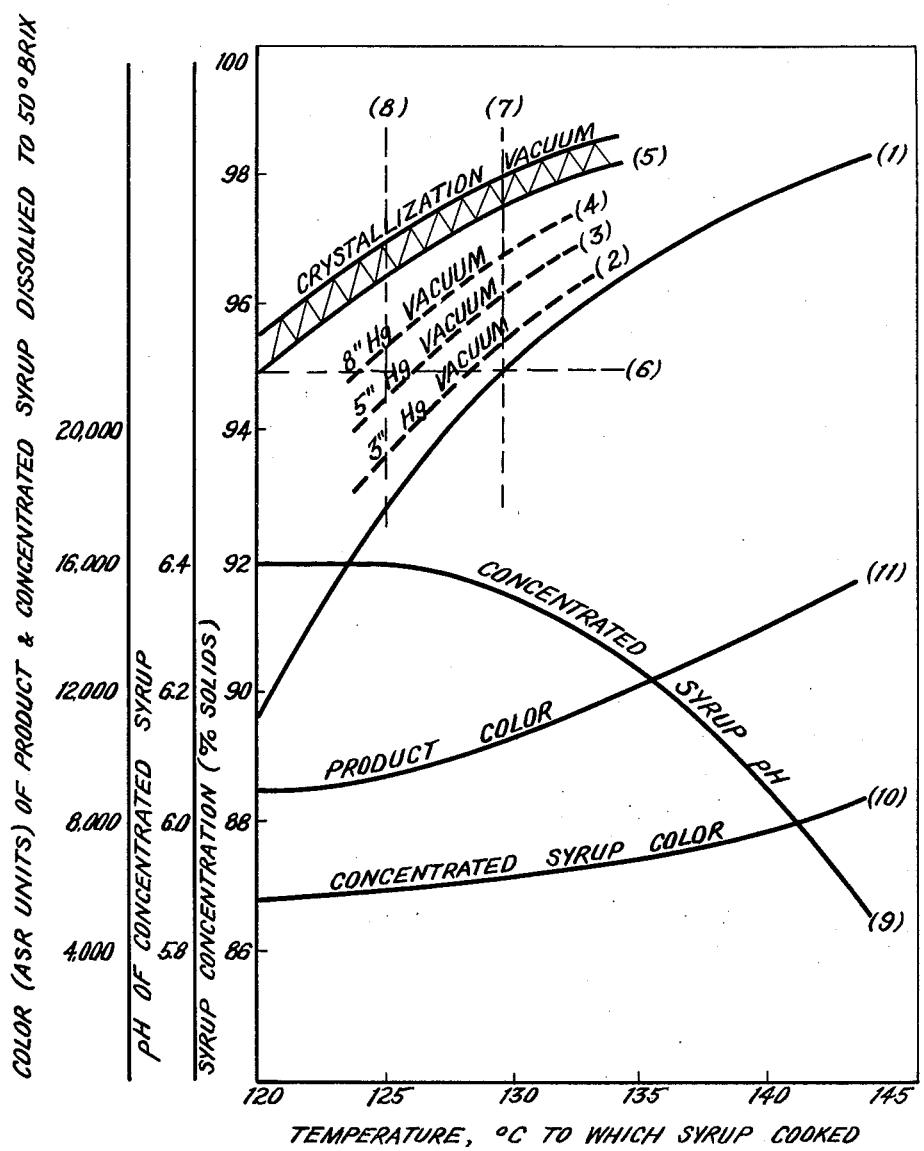
Figure 8:
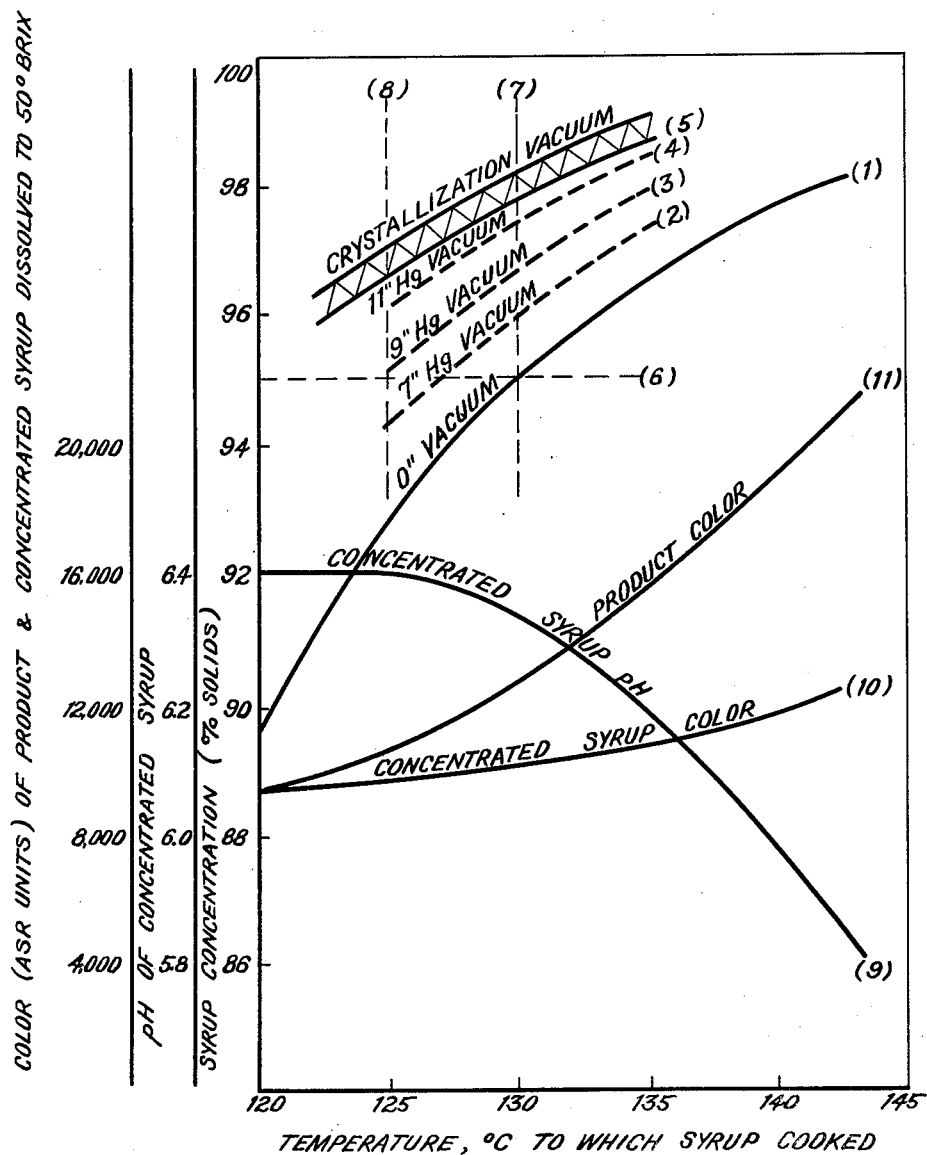

FIG. 4 is a process flow diagram schematically illustrating a process in accordance with this invention for the manufacture of a sucrose-containing sugar product consisting essentially of aggregates of fondant-size sucrose crystals; and wherein FIGS. 5, 6, 7 and 8 graphically illustrate certain operating control parameters, such as temperature and vacuum, employed during a syrup concentration operation and their combined influence upon the overall processing and the products obtained in the practice of this invention.

In accordance with this invention it has now been discovered that an improved process for the manufacture of a sugar product characterized by fondant-size sucrose crystals, such as aggregates of fondant-size sucrose crystals, is provided by concentrating a sucrose-containing sugar syrup to about 95–97% by weight solids, said sugar syrup containing not more than about 15% by weight non-sucrose solids, such as in the range 3–15% by weight, based on the solids content of said syrup, said concentrating operation being carried out at a temperature not greater than about 125–130° C., subjecting the resulting concentrated sugar syrup to a cooling operation with vigorous agitation under conditions to produce fondant-size sugar crystals, such as aggregates of fondant-size sucrose crystals, said cooling operation being carried out in the substantial absence of liquid water in contact with said sugar crystals, particularly aggregates of said crystals, and subjecting the resulting sugar product to drying and further cooling to produce a sugar product, such as a sugar product containing not more than about 1% by weight moisture, preferably below about 0.7% moisture. When the practice of this invention is applied to the treatment of sugar syrups containing normally non-crystallizable and sticky components, such as molasses and the like normally present in crude sugar syrups, these normally non-crystallizable and normally sticky materials, in addition to imparting a distinctive flavor to the resulting sugar product, also serve as a binding agent to bind the substantially microscopic size fondant sucrose crystals to yield aggregates thereof.

For the most part, the sugar products prepared in accordance with this invention are derived from feed sugar syrups ranging in purity from between about 85 to about 97%. When a sugar product is desired having a flavor intensity equivalent to the commercial grades of soft or brown sugars, it is generally desirable to employ a feed sugar syrup having a purity of about 94% or less. The feed syrups employed in the practice of this invention can be produced, generally with consistent quality, from straight or blends of cane refinery syrups, including pure sucrose syrups, granulated syrups, soft syrups and/or mechanically filtered syrups, such as remelt syrups, black strap and affination syrup as produced in a typical sugar refinery, or after further processing of such syrups to produce a syrup suitable for conventional soft sugar manufacture.

The non-sucrose solids in the feed syrups in the practice of this invention may also consist entirely, or in part, of inverted sucrose (equal portions of dextrose and levulose, so-called invert) or other reducing sugars manufactured by conventional starch conversion processes and generally referred to as corn syrups, potato syrups, dextrose, maltose and the like. The non-sucrose solids in the feed syrups may also consist of lactose and sugars derived from such diverse materials as honey, maple syrup and the like. Additionally, if desired, the non-sucrose solids might also be derivable from molasses or molassegenic components of black strap molasses, including the flavor and/or color components and ash-forming constituents, the invert portions thereof and the like, as well as materials from an extraneous source not usually produced, separated and/or recovered in a sugar refinery.

The feed sugar syrups employed in the practice of this invention, as generally indicated hereinabove, can be produced from a variety of sugar syrup blends. For example, one component of a feed sugar syrup in the practice of this invention may consist of pure sucrose syrup. In the practice of this invention a feed sugar syrup suitable for the production of a flavorful sugar product would be a 93% purity feed sugar syrup consisting of a blend of sugar syrups composed of about 84 parts sugar syrup of 100% purity and 16 parts cane refinery soft syrup of about 55% purity, assuming such syrups are of substantially equivalent Brix.

Referring now to the drawings, FIG. 1 thereof graphically illustrates the cooking or boiling temperature required to concentrate sugar syrups of varying purity to a syrup containing 95% by weight solids, the cooking or concentrating operation being carried out at atmospheric pressure. FIG. 1 indicates that a sugar syrup of 100% purity requires a cooking temperature of about 128.5° C. to yield a concentrated syrup containing 95% solids and that a sugar syrup having a purity of about 86% requires a cooking temperature of about 131° C. at atmospheric pressure to yield a syrup of 95% concentrated solids.

Referring now to FIG. 2 of the drawings, there is graphically illustrated therein that a sugar syrup cooked or exposed to a temperature above about 125–130° C. undergoes a marked drop in pH, indicating degradation of the sugar syrup at such elevated tempertures. As FIG. 2 indicates the extent of degradation of a sugar syrup due to exposure to a temperature above about 125–130° C. for a given minimum length of time depends upon the purity of the syrup.

Likewise, referring to FIG. 3 of the drawings, there is graphically illustrated therein the increase in color brought about in a concentrated sugar syrup when exposed to an elevated temperature above about 125–130° C. for a given minimum length of time.

The sugar syrups which provided the data illustrated in FIG. 2 were heated in a short contact time continuous evaporator at atmospheric pressure and the data graphically illustrated in FIG. 3 were obtained by heating syrups of various purities in a short contact time continuous evaporator at atmospheric pressure and the color of aqueous solutions of the sugar products produced from these syrups then determined.

Referring now to FIG. 4 of the drawings, there is schematically illustrated therein a flow diagram for the production of sugar products having special properties in accordance with this invention. A stream of sugar syrup from a suitable source, such as a granulated sugar syrup, is supplied via line 10 to mixing tank 11. There is also added to mixing tank 11 via line 12 another stream of sugar syrup of suitable purity so as to produce in mixing tank 11 after mixing by means of agitator 14 a uniform blend of sugar syrup having a purity in the range 85–97.

The resulting blend of syrup is supplied from mixing tank 11 via line 15 to pump 16 from which it is delivered via line 18 through a suitable flow control device, such as rotameter 19, the control of the flow through rotameter 19 being regulated by means of flow control valve 20a located in the output or effluent line 20 from rotameter 19. After passing through flow control valve 20a the syrup blend is supplied via line 20 to a suitable preheater such as tubular heater 21 provided with steam as the heating fluid, the steam to heater 21 being supplied via line 21a and the condensed steam issuing therefrom via trap 21b.

The heated sugar blend issues from heater 21 via line 22 which is provided with a suitable thermometer 22b for observing the temperature of the sugar syrup and/or to control the operation of heater 21 so that the sugar blend issues therefrom at a suitable temperature. Line 27 supplies the heated syrup blend to concentrator 24 which is also supplied with steam as the heating fluid via line 24a, the condensate being recovered via trap 24b. The resulting heated syrup blend issues from concentrator 24 via line 25 at a temperature not greater than about 125–130° C. Thermometer 25a is provided in line 25 to observe the temperature of the syrup blend issuing from concentrator 24 and to control the operation of concentrator 24 so as to prevent the syrup blend therein from being heated to a temperature above 125–130° C.

The heated syrup blend is passed from concentrator 24 via line 25 into vapor separator 26 which desirably, as illustrated in the drawing, is maintained under a suitable reduced pressure or vacuum. Manometer 28, connected to vapor separator 26 via tube 28a, serves as a means to observe the reduced pressure or vacuum within vapor separator 26. Reduced pressure or vacuum is maintained within vapor separator 26 by means of vacuum pump 29 which is in communication with vapor separator 26 via line 30, condenser 31 and line 32. Condenser 31 is supplied with condensing water via line 34 which has water flow control valve 34a therein. Steam leaving vapor separator 26 via line 32 is condensed by contact with the condensing water therein and resulting water and condensate is discharged via leg 35 into sump or well 36. Air bleed valve 30a is provided in line 30 as a suitable means for adjusting and/or maintaining the desired vacuum or reduced pressure within vapor separator 26.

In the operation of the process of this invention for the preparation of marketable sugar products, it has been found that the concentration of the syrup blend within concentrator 26 should be carried out to a solids content of about 95–97% by weight, the resulting concentrated syrup being recovered from vapor separator 26 via line 38. As illustrated in FIG. 1, at atmospheric pressure the temperature required to concentrate a given syrup in order to attain a desired high degree of solids content, such as about 95% solids, is a function of the syrup purity, i.e. percent sucrose in the total dissolved solids content of the syrup. In processes employed heretofore when syrups of relatively low purity, below about 95%, where concentrated to approximately 95–97% solids, concentrating temperatures above 125–130° C. were employed, the concentration operation being carried out at atmospheric pressure.

As illustrated in accompanying FIGS. 2 and 3, sugar syrups heated to a temperature above 125–130° C. undergo significant degradation as indicated by a decrease in feed syrup pH and by an increase in feed syrup and final sugar product color. Degradation occurs even when the time required for syrup concentration is very low and the concentration operation carried out rapidly such as by utilizing low retention time continuous heaters and concentrators. However, to whatever degree sugar degradation takes place such degradation is undesirable in that the products of degradation tend to reduce the rate at which crystallization can be carried out, thereby leading to the formation of undesirably large sugar crystals in the subsequent crystallization operation. The presence of large sugar crystals in the products of this invention is undesirable since large crystals reduce the anti-caking characteristics of the sugar product.

The rate of syrup degradation at elevated temperatures above about 125–130° C. is highly dependent upon the nature of the non-sucrose solids present in the sugar syrup. In commercial practice it is not feasible to attempt to control the nature of these non-sugars. These materials vary with the country of origin of the raw sugar from which the sugar syrups are derived and with varying plant refinery techniques and refinery operating schedules and other conditions. Accordingly, different syrups of the same purity concentrated at a given elevated temperature to a desired solids content, even during a given fixed heating period, tend to exhibit different quality characteristics, such as color and pH. Accordingly, on a practical commercial basis it is substantially impossible to produce a sugar product of uniform and reproducible quality and physical characteristics when the syrups from which such sugar products are derived are heated to an elevated temperature above about 125–130° C.

Further, in the operation of vapor separator 26 care should be taken not to carry out the concentration of the syrup blend under conditions, such as in the presence of sugar crystals, which result in inducing crystallization. If crystallization is induced within concentrator 24 or vapor separator 26 or in the concentrated syrup issuing therefrom via line 38 prior to introduction into beater-crystallizer 39, the rate of crystallization within beater-crystallizer 39 will be relatively slow. A slow rate of crystallization results not only in the formation of relatively large crystals but in the production of a wetter final sugar product. Further, for example, if in the operation of vapor separator 26, the syrup blend therein is concentrated beyond a certain point at a relatively low temperature, such as substantially below about 125° C., crystallization tends to spontaneously occur.

The relatively hot concentrated syrup is passed via line 38 to pump 40 from which it is transferred via line 41 to beater-crystallizer 39. The hot concentrated syrup should have a solids content in the range 95–97% by weight. A solids content below 95% results in too slow a crystallization for the production of a satisfactory product, and a solids content greater than 97% results in too great a chance of premature and spontaneous crystallization during concentration. Beater-crystallizer 39, as generally indicated in FIG. 4, is a jacketed vessel provided with an inlet conduit 42 for the supply of cooling water thereto and an outlet conduit 43 for the discharge of cooling water therefrom. Beater-crystallizer 39 is an elongated vessel and, as illustrated, may be provided with a rotatable shaft 39a mounted axially therein and provided with radial projections, fingers or paddles 39b. Suitable means, such as motor 44, operatively connected to shaft 39a serves to rotate shaft 39a and paddles 39b within beater-crystallizer 39. Vapor hood 45 is disposed in association with beater-crystallizer 39 for the collection and withdrawal of vapors which are withdrawn from hood 45 via conduit 46 and exhaust fan 48.

In the operation of beater-crystallizer 39 concentrated syrup blend is introduced into one end thereof via line 41 and, assuming beater-crystallizer 39 is a Werner-type beater-crystallizer as schematically illustrated in FIG. 4, a crystallized sugar product consisting essentially of aggregates of fondant-size sucrose crystals is recovered from the other end of beater-crystallizer 39 via line 49.

The operation of beater-crystallizer 39 for the conversion of a concentrated syrup into substantially dry-appearing aggregates of fondant-size sucrose crystals will vary depending upon ambient temperature and humidity conditions, as well as the purity of the syrup supplied thereto. Usually, the lower the syrup purity supplied to beater-crystallizer 39 the lower should be the speed or r.p.m. of shaft 39a in order to increase the retention time of the material being processed within crystallizer 39. It is estimated that the average particle retention time in beater-crystallizer 39 is in the range from about 1 to about 2 minutes at shaft speeds in the range about 150–250 r.p.m. and at a syrup feed rate of about 5 pounds of solids per minute.

The temperature of the material within beater-crystallizer 39 is controlled by circulating cooling water through the jacket surrounding beater-crystallizer 39. In actual practice it has been found necessary to control this temperature in order to insure optimum quality in terms of product size and moisture content. Specifically, it is desirable to operate beater-crystallizer 39 so that the sugar product issuing therefrom via line 49 contains a minimum of oversize product. This condition is favored by carrying out the crystallization operation and by operating beater-crystallizer 39 so that the crystallization occurring within beater-crystallizer 39 takes place in the substantial absence of liquid water, such as may be produced by the condensation of the water vapor emanating from the syrup within crystallizer 39. In the operation of beater-crystallizer 39 the sugar product issuing therefrom via line 49 should be of such size that it may be dried to a satisfactory low moisture content to yield a non-caking, flowable product, such as below about 0.7% by weight, in a relatively short time. Also, the sugar product issuing from crystallizer 39 should not be laden with condensed water vapor. Water vapor absorbed by the aggregates of the fondant-size sucrose crystals adversely affects the anti-caking properties of the final sugar product.

Also, in the operation of beater-crystallizer 39 it is desirable that the water jacket temperature not be maintained too low to obviate the possibility of the water vapor given off as a result of the heat of crystallization condensing within beater-crystallizer 39. The water vapor would tend to condense on the interior surface of beater-crystallizer 39 and to be condensed on the product therein. In operation it has been observed that a suitable jacket temperature of crystallizer 39 is one which results in substantially a comprise which minimizes the ill-results obtained when the jacket temperature is too high or too low. Satisfactory results have been obtained by maintaining the jacket temperature during crystallization at a temperature of 52–82° C., more or less, depending upon the ambient conditions of temperature and relative humidity, the purity of the concentrated syrup and the rate at which the concentrated syrup is supplied to the crystallizer.

In the operation of beater-crystallizer 39 the microscopic, fine, fondant-size sucrose crystals present in the product issuing from the beater-crystallizer 39 via line 49 result from the very rapid crystallization of the sucrose from the highly concentrated hot syrup supplied to beater-crystallizer 39 via line 41. The solids concentration in the syrup is an important factor in the operation of the process of this invention and in the production of marketable sugar products. At the proper degree of solids concentration rapid crsyatllization in the concentrated syrup is induced by vigorous mechanical agitation of the syrup upon introduction into beater-crystallizer 39. Rapid crystallization of the syrup within beater-crystallizer 39 produces a material characterized by extremely fine, such as crystals having a particle size in the range 3–50 microns, sucrose crystals making up the aggregates in the final sugar product. The crystals thus produced are substantially dry.

The production of fondant-size sucrose crsyatls is necessary in the practice of this invention in order that a large amount of surface area be available to allow for distribution of any remaining syrup mother liquor in the form of a very thin film over the sucrose crystals. These fondant-size sucrose crystals together with the remaining syrup mother liquor form aggregates within beater-crystallizer 39.

It has been observed that relatively large size sucrose crystals result in having formed thereon an undesirably thick film of mother liquor and it has also been observed that crystals with a relatively thick mother liquor film, such as a film of molasses, making up the outer surface of an aggregate of sucrose crystals, causes aggregates to clump together. Since molasses and similar hydroscopic, substantially non-drying, non-sucrose materials which make up the remaining mother liquor, are often present in the syrups which are employed as raw materials, a relatively thick film of such material, upon exposure to air, causes aggregates to absorb excessive moisture and result in product caking. Also, the presence of thick films of a relatively large amount of molasses or hygroscopic, non-sucrose materials results in a wetter product.

A profile of typical operating data with respect to crystallizer 39, specifically a Werner beater-crystallizer about 48" long equipped with two paddle shafts rotating at 150 r.p.m. and supplied with concentrated sugar syrups at a rate of about 5.5 pounds of solids per minute is set forth in accompanying Table I:

Table I

|  | Purity (Percent Sucrose in sol.) | Temp. (° C.) | Brix (Percent Total Solids) | Rate |
|---|---|---|---|---|
| Feed syrup into beater | 93 | 125 | 95–96½ | 5.79 lbs./min. |
| Jacket water into beater |  | 52–82 |  | 6 g.p.m. |
| Jacket water out of beater |  | 49–77 |  | 6 g.p.m. |
| Product out of beater | 93 | 54 | 97½–98½ | 5.46 lbs./min. |
| Product out of dryer | 93 | 83 (max.) | 99.3 (min.) |  |

In the operation of this device, concentrated syrup is fed to the rear end of one shaft together with, if desired, fines e.g. a −48 mesh product fraction from a prior screening operation, at a rate up to an amount about equal to the syrup feed rate. Upon introduction into the beater-crystallizer the syrup crystallizes immediately and is conveyed by the action of the rotating beater paddles along the length of the shaft at a rate of about 1.06 inches per second. The total material retention time in the beater-crystallizer is about 1.5 minutes, the time required for any particular amount of charge material to travel the full 98" from point of introduction to point of discharge.

It appears that the maximum rate of crystallization accompanied by maximum water vapor release takes place at about the completion of the first 30" of travel within the beater. At this stage the charge material appears to "set" and becomes transformed from the gummy or pasty stage to relatively large aggregates. After a length of travel of about 48", the first shaft of the two-shaft crystallizer ends and the aggregates already formed are transferred by the action of the rotating paddles to the feed end of the second shaft which moves the material towards the discharge end. While traveling the 48" length along the second shaft, the aggregates become more brittle in texture and assume a characteristic spherical appearance, the large aggregates therein being about ¼" to ⅜" in diameter.

Referring again to FIG. 4 of the drawing, the aggregate sugar product issuing via discharge line 49 from beater-crystallizer 39 is introduced into dryer-cooler 50. Upon introduction into dryer-cooler 50 the aggregate sugar product is at a temperature in the range about 50–80° C. and has a moisture content in the range about 1.5–2.5% by weight, such as about 1.8% by weight. Dryer-cooler 50 may be any suitable commercially available dryer-cooler, such as a tray dryer or a rotary dryer, such as a Hersey granulator or a Roto Louvre granulator or a separate dryer and a separate cooler.

Ambient air is supplied via line 51 through heater 52 and conduit 54 into dryer-cooler 50 to effect drying of the sugar product therein. The air is removed from dryer-cooler 50 via discharge conduit 55 and exhaust fan 56. Additional air, such as for cooling purposes, or to modify the drying-cooling conditions within dryer-cooler 50, is supplied via lines 51 and 58.

The resulting dried, cooled sugar product is removed from dryer-cooler 50 via line 59 and supplied to a suitable size reduction apparatus, such as comminuting mill 60 or transferred via lines 59 and 57 to screening unit 62. The resulting finely divided, comminuted product is discharged via line 61 and passed to size separating or screening unit 62, oversize material, e.g. +14 mesh, being returned via line 64 to comminuting mill 60 or being separately recovered as product, and the undersize material or fines, e.g. −48 mesh, being recovered via line 65 and returned to beater-crystallizer 39 via line 66. Also, fines are recovered as product as such via line 65 or after blending with a suitable additive material, such as powdered starch or other anti-caking material, added to line 65 via line 68. A granular product of desired size, e.g. −14 mesh +48 mesh, is recovered from sizing unit 62 via line 69.

Concerning the comminuting operation carried out in comminuting mill 60, the size reduction can be carried out satisfactorily before or after drying. As a size reduction unit, a Fitzmill Comminuter equipped with 16 knife blade hammers rotating at 3000 r.p.m. and provided with a 7/16" round hole screen has been found to be satisfactory. Screen analyses of a typical product, before and after milling, is set forth in accompanying Table II:

Table II

| Size | Unmilled, percent, by weight | Milled, percent, by weight |
|---|---|---|
| +14 mesh | 65 | 0 |
| −14 mesh to +48 mesh | 20 | 65 |
| −48 mesh | 15 | 35 |

The drying of the product as it leaves beater-crystallizer 39 is a relatively simple operation. Desirably, the drying operation is carried out under conditions such that the sugar aggregates are maintained in motion in order to insure uniform distribution of drying gas, such as hot air, around the individual aggregates. When the drying operation is carried out in this manner, a thorough drying can be accomplished within a relatively short period of time, such as within about 2 minutes, employing air of a temperature of about 120° C. Vibratory type conveyor dryers may also be satisfactorily employed for dryer-cooler 50. An oven dryer or tunnel or tray dryer wherein the material is maintained in a substantially static condition requires about 8–12 hours at a temperature of about 85° C. to effect a satisfactory drying so as to reduce the moisture content from about 1.5% to about 0.5%, preferably below about 1%.

Screening of the dryer product is readily carried out by means of any suitable commercially available screening unit. It has been observed that the sugar product is relatively resistant to abrasion. The fines product, i.e. aggregates having a particle-size less than about −48 mesh, however, tend to absorb an excessive amount of moisture. It has been found desirable to carry out the comminuting and screening operations under controlled conditions of relative humidity in order to prevent the product fines from becoming sticky and clogging or blinding the screen. This difficulty can readily be avoided by carrying out the comminuting and sizing or screening operation under conditions of controlled humidity.

As a preliminary to the consideration of FIGS. 5, 6, 7 and 8 of the drawings, it is pointed out that it is not possible to arbitrarily select any specific lower temperature and to carry out the concentration operation at any given vacuum or reduced pressure which will generally result in the desired degree of solids concentration, i.e. in the range 95–97% by weight. The purity of the sugar syrup influences the concentration operation. If the concentration temperature is too low, such as might result when the concentration operation is carried out under a greatly reduced pressure or high vacuum, crystallization might prematurely occur within the concentrator. For example, a 90% purity feed syrup will crystallize spontaneously at about a concentration of 79% solids under vacuum of 24″ Hg, corresponding to a concentration temperature or boiling temperature under these conditions of about 109° C.

Referring now to FIGS. 5, 6, 7 and 8, these figures illustrate and define the safe and critical operating control limits of the process of this invention with respect to the concentration of typical cane refinery syrups of different purities.

Referring particularly to FIG. 5, for purposes of illustration, the data illustrated therein were derived from a sugar product and a feed syrup produced by blending syrups to 94.8% purity. The data are applicable to feed syrups within the range from about 93 to about 96% purity. Line 1 of FIG. 5 graphically sets forth the relationship between cooking temperature and syrup concentration at atmospheric pressure or 0 vacuum. From FIG. 5 it is seen that the syrup must be heated to about 129° C., the intersection of line 1 with dashed line 6, in order to reach the critical and desired minimum solids concentration of 95%. Dashed lines 2, 3 and 4 illustrate the relationship between concentration temperature and syrup concentration at 3″, 5″ and 6″ of mercury vacuum, respectively, to produce a syrup solids concentration of 95% under these conditions. Line 5 and the hatched area directly above line 5 define and delineate a critical area above which crystallization will occur in the concentrator. Line 5 therefore defines an upper limiting vacuum which must not be exceeded if crystallization during concentration is to be avoided.

Accordingly, FIG. 5 and FIGS. 6, 7 and 8 serve as reference guides to determine the practical and safe operating vacuum for achieving a given concentration at a given temperature. For example, in order to reach a concentration of 95% solids at a temperature lower than that required when the concentration is carried out at atmospheric pressure, a temperature and vacuum must be chosen so that the operating conditions are defined by a point with the general triangular area defined by lines 6, 5 and 7. It is seen that at 125° C. represented by dashed line 8, the temperature is well below the point where unreasonable feed syrup and product degradation takes place; see lines 9, 10 and 11. At this temperature a vacuum of about 5½ to 6″ of mercury would appear satisfactory. FIG. 5 also indicates that it would be practical to carry out the concentration operation at a higher temperature, such as 128° C. with respect to a 95% purity syrup by carrying out the concentration operation at about 4 to 6″ mercury vacuum. FIGS. 5, 6, 7 and 8 therefore comprise a family of operating charts useful in carrying out and delineating the practice of this invention, these charts indicating the necessity of selecting 125° C.–130° C. as the maximum concentration temperature, not to be exceeded, in order to avoid syrup degradation and resulting variance in product quality. Concentration temperatures or operating temperatures below 125–130° C., such as below about 120° C., result in little improvement in product characteristics or reproducibility and increase the risk of premature crystallization because of the narrower operating range bounded by the spontaneous crystallization vacuum curve line 5 and the critical minimum concentration, 95% solids, delineated by dashed line 6.

In preparing a blend of refinery syrups, such as within the range 85–91% purity, as feed syrup in the process of this invention, it has been found desirable to determine in such blend if there is an amount of invert sugar (a 50–50 mixture of levulose and dextrose), over that originally present in the raw sugar from which the syrup was derived. Any amount of excess invert found would be due to poor refinery techniques unless intentionally added. In this relatively low syrup purity range, it has been found that an excess amount of invert sugar in the total non-sucrose solids in the syrup is particularly undesirable since it results in poor caking resistance in the final sugar product.

One technique is determining the excess invert content is to measure the invert to ash ratio in the syrup blend. This ratio should not exceed about 3.0 based on an 85% purity syrup. Generally, the invert to ash weight ratio in raw sugar is in the range 2.0–2.5 and approximately equivalent proportions or amounts of invert and ash are removed in normal sugar refining operations. Accordingly, if sugar refining operations are proceeding normally the invert to ash ratio should remain substantially unchanged in granulated and remelt syrups. A ratio of 3.0–3.5 or above for any of these syrups is an indication that some inversion is taking place during the sugar refining operation. Higher invert to ash ratios of syrups, however, are tolerable for higher purity feed syrups. Accompanying Table III sets forth a satisfactory and suitable safe invert to ash ratio of feed syrups for various purity feed syrups to produce a satisfactory and marketable final sugar product.

Table III

| Feed syrup purity: | Invert to ash ratio (I/A) desirably not exceeded |
|---|---|
| 85–91 | 3.0. |
| 91–93 | 3.5. |
| 93–97 | Not critical. |

In the practice of this invention it is preferred that when feed syups containing invert are employed, the invert be not more than 12% by weight of the feed syrup, desirably not more than 8% by weight.

In accordance with a special feature of the practice of this invention to improve product color and to increase sugar product "bloom" it has been found desirable to incorporate various special additive materials, such as minor amounts of phosphoric acid or minor amounts of various salts of phosphoric acid, such as the alkali metal salts, e.g. sodium salts, preferably in the form of a saturated aqueous solution, to the concentrated syrup just prior to or as it is introduced to the crystallizer or even, if desired, to the syrup within the concentrator. The materials tested and the amounts found effective are set forth in accompanying Table IV:

Table IV

| Material | Formula | Percent by Weight Based on Syrups Solids |
|---|---|---|
| Phosphoric acid | $H_3PO_4$ | 0.1–0.8 |
| Monosodium dihydrogen phosphate | $NaH_2PO_4$ | 0.1–0.8 |
| Disodium monohydrogen phosphate | $Na_2HPO_4$ | 0.1–0.8 |
| Trisodium phosphate | $Na_3PO_4$ | 0.1–0.8 |

These additive materials do not appear to alter product characteristics other than color. Other salts besides the above sodium salts of phosphoric acid, including potassium, calcium and mangesium phosphates, as well as other acids and their salts, including citric acid and ascorbic acid, also useful.

The sugar products prepared in accordance with this invention are particularly useful as a carrier for other materials. These other, additive materials which may have a food value or a taste value or a color value or a medicinal value and the like, can suitably be introduced at substantially any step in the process, such as during concentration, crystallization, comminuting, screening or by a separate blending and mixing operation with the sugar product, depending upon the nature of the additive material.

For example, if the additive material is water-soluble and substantially non-volatile, e.g. inorganic salt, it may be introduced to the syrup blending taank along with the syrup before concentration or directly to the concentrator such as in the form of a solution, or to the crystallizer or beater in similar form. If the additive material is temperature sensitive or substantially insoluble or if it is desired not to introduce the additive material in solution form, it may be added dry to the crystallizer or to the sugar product during drying or during comminuting and/or during screening. If the additive material is soluble in a food grade, volatile, organic liquid, such as ethyl alcohol, it can be introduced along with the concentrated syrup to the crystallizer.

It is generally desirable to introduce the additive material as early in the process as practicaly in order to insure maximum homogeneity of the final product. Solid, insoluble, additive material desirably should not be incorporated or present in the syrup during concentration since these solid materials would tend to promote premature crystallization. These solid additive materials are preferably added during the crystallizing operation. There the additive materials are thoroughly mixed in the first stages of the crystallizing operation as the syrup is transformed from the liquid form to a paste form. When the material within the crystallizer has reached the relatively dry, aggregate form, about midway down the length of travel of the material through the beater-crystallizer the resulting aggregate material is a good blend of the sugar product and the additive material.

For example, vitamins such as vitamin D in an amount of about 30 mg. per ounce of sugar product may be incorporated therein. Vitamin additive material may be added to the syrup, before or after or during concentration, in the case of heat stable vitamin material, or during crystallization, drying or screening in the case of heat labile vitamin material. Pharmaceutical arditive materials in the amount 0.1–50% by weight of the sugar product, depending upon the particular pharmaceutical desired, may be incorporated therein. Various pharmaceutical materials which may be incorporated in the sugar product include dicalcium phosphate and, in the lower concentration range, the various antibiotics. Spices or flavoring agents in the range 0.25–50% by weight, depending upon the flavor level desired and the particular spice, may be incorporated in the sugar product. Suitable such materials include garlic powder, chocolate and cinnamon. Also, various inert filler materials in the range 1–50% by weight of the sugar product, such as microcrystalline cellulose (Avicel), carboxymethylcellulose, may also be incorporated therein. Further, the various starch conversion products, such as tapioca starch, corn starch, esters or starches and the solubilized starches, in an amount in the range 0.5–25% by weight may be incorporated in the sugar product. Also, various other materials, such as potato syrup (wet basis) and honey and maple syrup in the amount 0.5–25% by weight may be incorporated in the sugar product.

As will be apparent to those skilled in the art in the light of the foregoing disclosure, many modifications, alterations and substitutions are possible in the practice of this invention without departing from the spirit or scope thereof.

We claim:
1. A method which comprises concentrating a sugar syrup to about 95–97% by weight solids, said sugar syrup containing in the range about 3–15% by weight non-sucrose solids based on the solids content of said syrup, said non-sucrose solids comprising invert and the ash, flavor, and color molassegenic components of blackstrap molasses, said concentrating operation being carried out so that no crystallization takes place and at reduced pressure and at a temperature not greater than about 130° C., immediately subjecting the resulting concentrated sugar syrup to a heat dissipation operation simultaneously with vigorous agitation under conditions to produce aggregates of fondant-size sugar crystals, said heat dissipation operation being at least sufficient to dissipate the heat produced by agitation and crystallization and being carried out in the substantial absence of liquid water in contact with said aggregates, and subjecting the resulting sugar product to drying and further cooling to produce an aggregate sugar product containing not more than about 1% by weight moisture.

2. A method in accordance with claim 1 wherein said sugar syrup contains not more than about 12% by weight invert.

3. A method in accordance with claim 1 wherein said reduced pressure is not more than about 15″ Hg below atmospheric pressure.

4. A method in accordance with claim 1 wherein said sugar syrup has a purity in the range 85–91% and an invert to ash weight ratio not more than about 3.0.

5. A method in accordance with claim 1 wherein said sugar syrup has a purity of about 93%.

6. A method in accordance with claim 1 wherein said sugar syrup has a purity in the range 85–91%.

7. A method in accordance with claim 1 wherein said sugar syrup has a purity in the range 91–93% and an invert to ash weight ratio not more than about 3.5.

8. A method in accordance with claim 1 wherein said sugar syrup has a purity in the range 93–97%.

9. A method in accordance with claim 1 wherein a water-soluble phosphate is included in said aggregate sugar product, said water-soluble phosphate being included in an amount in the range 0.1–1.0 by weight based on said solids in said sugar syrup.

10. A method in accordance with claim 9 wherein said water-soluble phosphate is trisodium phosphate.

11. A method in accordance with claim 9 wherein said water-soluble phosphate is disodium hydrogen phosphate.

12. A method in accordance with claim 9 wherein said water-soluble phosphate is monosodium dihydrogen phosphate.

13. A method in accordance with claim 9 wherein said water-soluble phosphate is phosphoric acid.

14. A method which comprises concentrating a sugar syrup to about 95–97% by weight solids, said sugar syrup containing not more than 15% by weight non-sucrose solids based on the solids content of said syrup, said non-sucrose solids comprising invert and the ash, flavor, and color molassegenic components of blackstrap molasses, said concentrating operation being carried out so that no crystallization takes place and at reduced pressure and at a temperature not greater than about 130° C., immediately subjecting the resulting concentrated sugar syrup to a heat dissipation operation simultaneously with vigorous agitation under conditions to produce aggregates of fondant-size sugar crystals, said heat dissipation operation being at least sufficient to dissipate the heat produced by agitation and crystallization and being carried out in the substantial absence of liquid water in contact with said aggregates, recovering from said cooling operation a sugar product having a moisture content of about 2% water and subjecting said aggregate sugar product to drying and further cooling to produce an aggregate sugar product containing not more than about 0.7% by weight moisture.

15. A sugar product consisting essentially of aggregates of fondant-size sugar crystals produced in accordance with claim 1.

(References on following page)

References Cited by the Examiner

UNITED STATES PATENTS

| | | | |
|---|---|---|---|
| 957,113 | 5/10 | Shaw | 127—16 |
| 989,366 | 4/11 | Kestner | 127—61 |
| 1,309,425 | 7/19 | Shaw et al. | 127—61 XR |
| 1,454,153 | 5/23 | Carr et al. | 127—30 |
| 2,030,461 | 2/36 | Moss | 127—30 |
| 2,373,919 | 4/45 | Schweiger | 127—30 |

FOREIGN PATENTS

| | | |
|---|---|---|
| 28,296 | 1903 | Great Britain. |
| 28,297 | 1903 | Great Britain. |
| 4,112 | 1904 | Great Britain. |
| 27,185 | 1913 | Great Britain. |

OTHER REFERENCES

Honig: Principles of Sugar Technology, 1959, vol. II, Crystallization, Elsevier Publishing Co., New York; pp. 174–177, 282–286, 403–410, 495–498 and 540 particularly relied on.

MORRIS O. WOLK, *Primary Examiner.*